Oct. 10, 1961  J. T. HARRIS  3,003,172
WINDSHIELD WIPER MECHANISM
Filed July 27, 1959  3 Sheets-Sheet 3
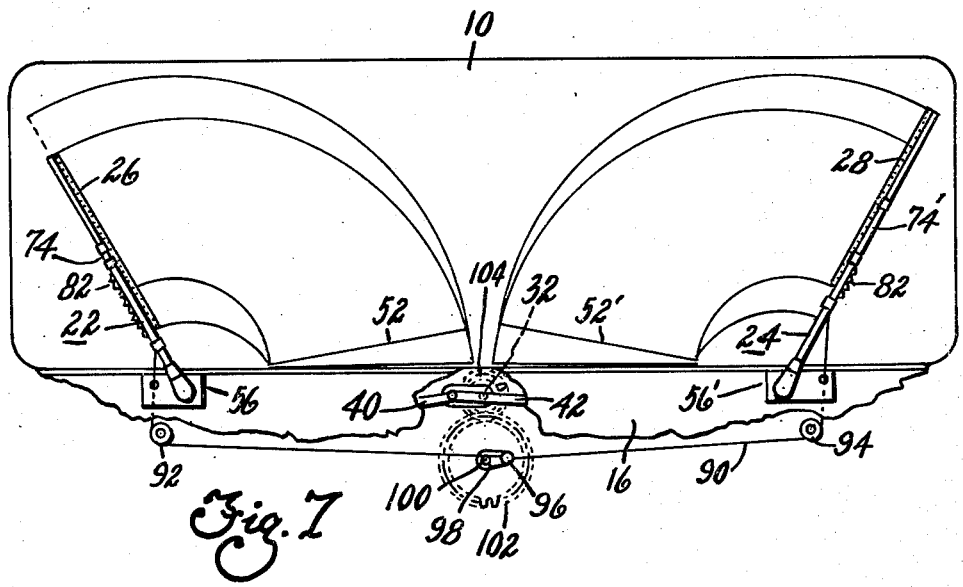
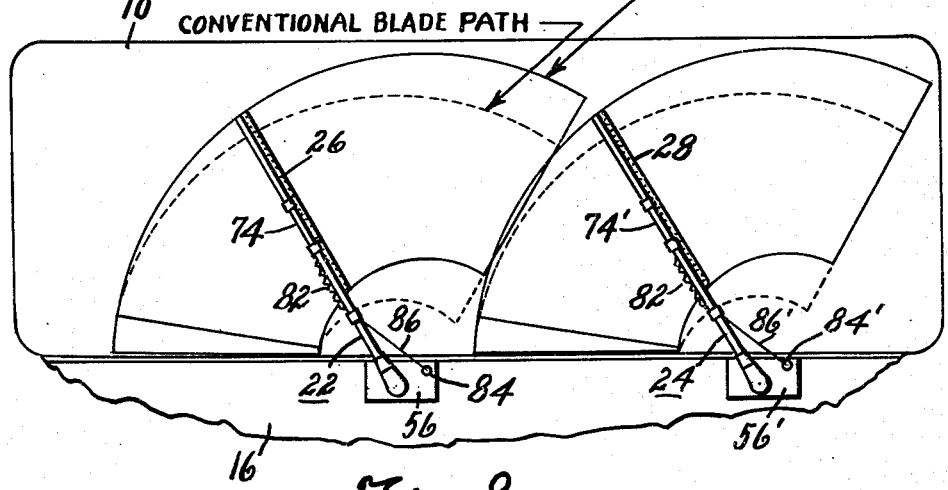
INVENTOR.
JESSE T. HARRIS
BY
HIS ATTORNEY

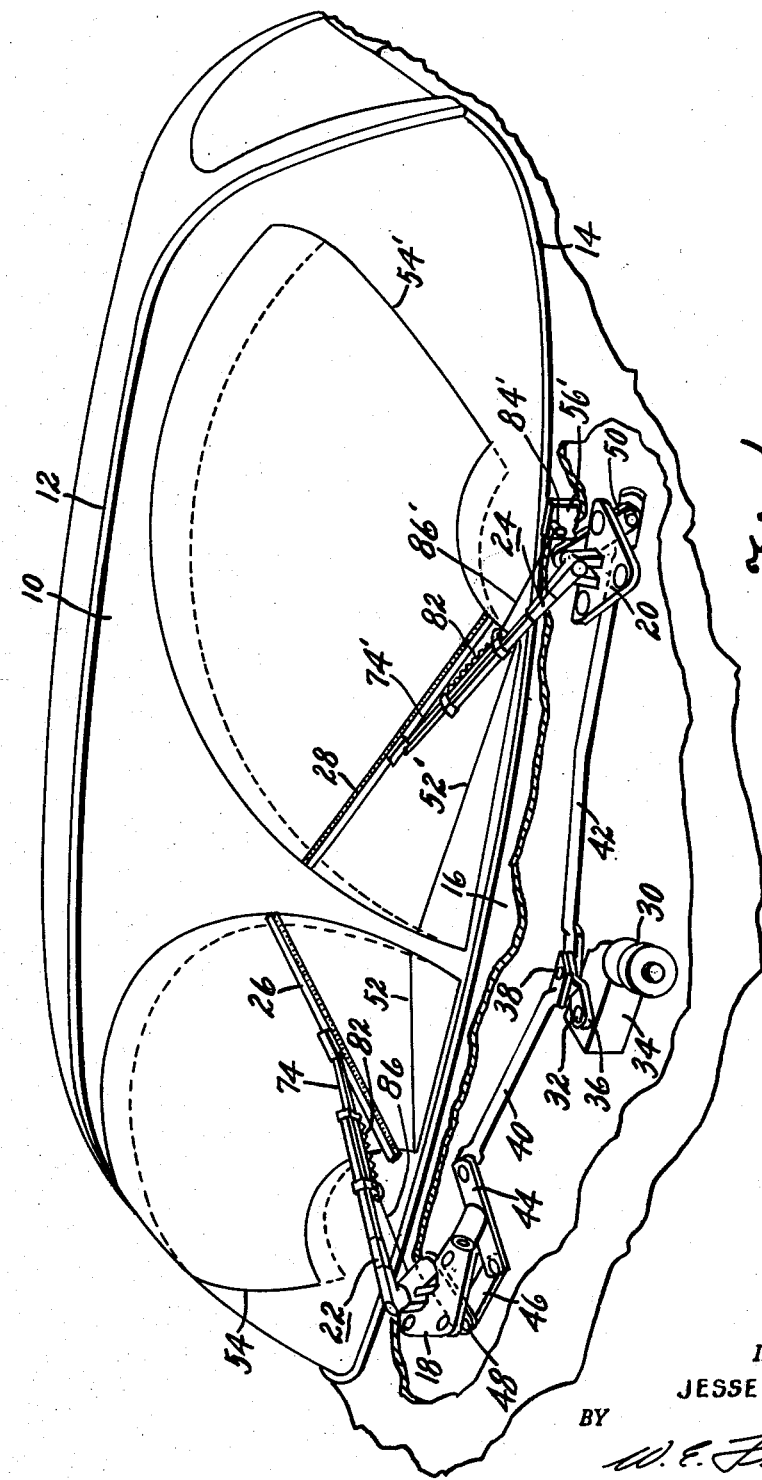

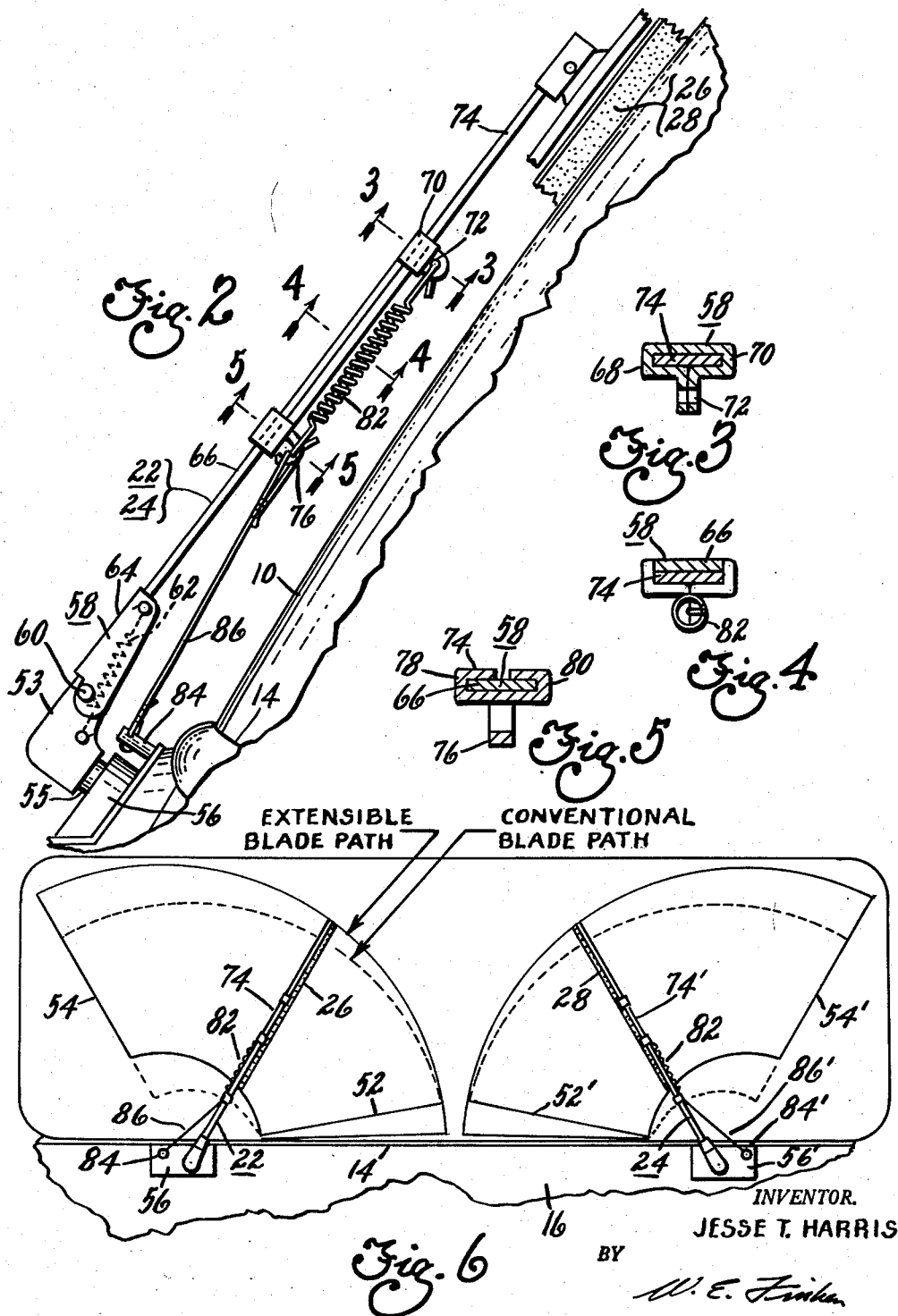

United States Patent Office 3,003,172
Patented Oct. 10, 1961

3,003,172
WINDSHIELD WIPER MECHANISM
Jesse T. Harris, Rochester, N.Y., assignor to General Motors Corporation, Detroit, Mich., a corporation of Delaware
Filed July 27, 1959, Ser. No. 829,753
12 Claims. (Cl. 15—250.23)

This invention pertains to the art of windshield cleaning, and particularly to windshield wiper mechanism including extensible wiper arms.

At the present time the majority of motor vehicles are equipped with windshield cleaning mechanism comprising a pair of spaced wiper arms carrying wiper blades which are oscillated either asymmetrically or symmetrically across the outer surface of the windshield. The pivot axes of the wiper arms are spaced apart a distance sufficient to allow the wiper blades to be parked in a substantially horizontal position against the lower reveal molding of the windshield. With the present styling trend of lowering the overall height of the vehicle, the frontal portion of the windshield is severely slanted to the rear, and thus has a substantially greater area. However, the driver's vision is limited by the vertical distance between the upper and lower edges of the windshield, and in most instances the primary field of vision is the upper half of this vertical distance. By increasing the length of the wiper blades, the total area of the windshield which is cleaned thereby can, of course, be increased. However, in the case of asymmetrically oscillated wipers the length of the blades cannot be increased to the desired extent unless an overlapping drive mechanism is used, such as shown in copending application Serial No. 756,097, filed August 20, 1958, in the name of Robert M. Fox and assigned to the assignee of this invention.

The present invention relates to mechanism including an extensible arm for increasing the radius of the path of the wiper blade as it moves from the horizontal, or inboard, stroke end position, to the outboard stroke end position so that a greater portion of the upper half of the windshield will be cleaned than with conventional wiper mechanism. Accordingly, among my objects are the provision of windshield wiper mechanism including a pair of wiper blades carried by extensible wiper arms including means for automatically varying the length of the wiper arms during oscillatory movement thereof; the further provision of an extensible wiper arm comprising a pair of relatively movable sections and resilient means normally urging said sections in a direction to extend the length of the arm; the further provision of windshield cleaning mechanism including a wiper arm having spring biased longitudinally adjustable sections and means automatically controlling movement of said sections during oscillation thereof; and the still further provision of windshield cleaning mechanism including a pair of extensible arms and means for controlling alternate extension and retraction of the arms in timed relation with oscillation thereof across the surface of a windshield.

The aforementioned and other objects are accomplished in the present invention by utilizing a spring biased extensible wiper arm and cable means movable with the arm for automatically controlling the length of the arm during oscillation thereof. Specifically, two embodiments of means for controlling the operating length of the wiper arm are disclosed herein. The wiper arm, per se, comprises a socket section adapted to be drivingly connected to a pivot shaft and an intermediate section pivotally connected to the socket section on an axis substantially normal to the axis of the pivot shaft, the intermediate section and the socket section being interconnected by a spring. The spring urges the intermediate section of the wiper arm towards the windshield in a conventional manner for applying wiping pressure to a wiper blade. An outer arm section is supported for sliding movement relative to the intermediate arm section along the longitudinal axis of the arm. The terminal end of the outer arm section is adapted to be detachably connected to a wiper blade, and the intermediate and outer arm sections are interconnected by a compression spring which biases the other arm section outwardly, or away, from the pivot shaft.

In both embodiments of the control means disclosed herein, one end of a flexible cable is attached to the inner end of the outer arm section. In the first embodiment the other end of each control cable is attached to a pin, or lug, on the pivot shaft escutcheon. The pin is eccentrically located relative to the pivot shaft in such a manner so that when the wiper arm is in a substantially horizontal position the axis of the pivot shaft will lie between the lug and the terminal end of the wiper arm, and during oscillation of the wiper arm throughout an angle of substantially 120° from the horizontal position the lug will be between the axis of the pivot shaft and the outer end of the wiper arm so that the wiper arm will be fully retracted in the horizontal position and fully extended at the outboard stroke end limit. Moreover, during oscillation of the wiper arm from the horizontal position to the outboard stroke end limit the cable automatically permits the outer arm section to be progressively extended by the spring so that a greater portion of the upper half of the windshield will be cleaned by the wiper blade.

In the second embodiment a single control cable is used for a pair of wiper arms. Opposite ends of the cable are attached to the outer arm sections. The cable is guided around idler pulleys, and the intermediate portion thereof is attached to a crank pin. The crank pin is carried by a crank arm driven by a gear. The gear is driven in timed relation with the wiper motor, which, as disclosed, comprises a unidirectional motor having a rotary output shaft. As disclosed, the cable drive gear makes one revolution for every two revolutions of the motor driven wiper actuating crank. However, the two to one gear reduction is disclosed only by way of example and is not to be construed by way of limitation.

In the second embodiment the arrangement is such that the left hand and right hand wiper blades traverse different paths during oscillation thereof throughout two complete strokes. In other words, when the right hand wiper arm is fully extended at the outboard stroke end limit, the left hand wiper arm is fully retracted. Both arms are half extended at the horizontal position, or inboard stroke end limit, and during the next complete stroke the left hand wiper arm will be fully extended at the outboard stroke end limit while the right hand wiper arm is fully retracted. By employing the control means of the second embodiment a greater portion of the total windshield area will be cleaned by the wiper blades than in the first embodiment since the blades traverse different paths on alternate strokes.

Further objects and advantages of the present invention will be apparent from the following description, reference being had to the accompanying drawings, wherein preferred embodiments of the present invention are clearly shown, and wherein similar numerals denote similar parts throughout the several views.

In the drawings:

FIGURE 1 is a fragmentary perspective view, partly in section and partly in elevation, of a vehicle equipped with the extensible wiper arms and control means of one embodiment of this invention.

FIGURE 2 is a fragmentary view, in elevation, of the wiper arm in a partially extended position.

FIGURES 3, 4 and 5 are sectional views taken along lines 3—3, 4—4 and 5—5, respectively, of FIGURE 2.

FIGURE 6 is a diagrammatic view comparing the areas wiped by conventional wipers and extensible arm wipers of this invention.

FIGURE 7 is a fragmentary diagrammatic view of extensible arm control means constructed according to the second embodiment of this invention.

FIGURE 8 is a diagrammatic view illustrating a symmetrical wiping system having extensible wiper arms and the control means of the first embodiment.

With particular reference to FIGURE 1, a portion of a vehicle is shown including a windshield 10 having a frontal portion of compound curvature that is considerably displaced from the vertical. The upper edge of the windshield is defined by an upper reveal molding 12 having downwardly extending side pillar portions, and the lower edge of the windshield is defined by a lower reveal molding 14 which is attached to the vehicle cowl 16. A pair of spaced pivot shaft brackets 18 and 20 are suitably attached to the cowl, a pivot, or wiper, shaft being rotatably supported in each bracket. Wiper arms 22 and 24 are drivingly connected to the pivot shafts, the wiper arms carrying wiper blades 26 and 28, respectively, which are oscillated over asymmetrical paths across the frontal portion of the windshield 10.

The drive mechanism for imparting asymmetrical oscillation to the wiper arms and blades may be of any suitable type such as disclosed in copending application Serial No. 718,789, filed March 3, 1958, in the name of Contant et al. and assigned to the assignee of the present invention. Thus, the drive mechanism may include a unidirectional electric motor 30 which is drivingly connected to a rotary crank shaft 32 through suitable gear reduction mechanism and a variable crank throw assembly disposed within a housing 34 which is attached to the firewall of the vehicle. The crank shaft 32 has a crank arm 36 drivingly connected thereto having a crank pin 38 at its outer end to which the inner ends of drive links 40 and 42 are rotatably connected. The outer end of drive link 40 is pivotally connected through a ball and socket joint to one end of a reversing link 44 having an intermediate pivotal support on the bracket 18. The other end of the reversing link 44 is pivotally connected to a drive arm 46 that is also pivotally connected to a crank arm 48 attached to the pivot shaft journalled in the bracket 18. The drive link 42 is connected through a ball and socket joint with a crank arm 50 that is attached to the pivot shaft journalled in the bracket 20. Accordingly, during rotation of the crank shaft 32 and the crank arm 36 the wiper arms 22 and 24 and blades 26 and 28 carried thereby will be oscillated over asymmetrical paths between inboard stroke end positions indicated by lines 52 and 52' and outboard stroke end positions indicated by lines 54 and 54'. The wiper blades 26 and 28 can also be moved to a depressed parked position at which time they engage the lower reveal molding 14 of the windshield and are located in a substantially horizontal plane.

With particular reference to FIGURES 2 through 5, the wiper arms 22 and 24 are of identical construction except for the left hand and right hand terminal portions thereof. Thus, each wiper arm includes a socket section 53 which is drivingly connected with a pivot shaft 55 that extends through an opening in an escutcheon 56 attached to the cowl of the vehicle as depicted in FIGURE 2. An intermediate arm section 58 is pivotally connected to the socket section 53 by a transversely extending pin 60, the intermediate section 58 being biased towards the windshield 10 by a helical spring 62, one end of which is connected to the intermediate arm section 58 and the other end of which is connected to the socket section 53. The intermediate arm section 58 includes a portion 64 of channel shape having ears through which the pin 60 extends, and a portion of rectangular cross-section 66. The outer end of the intermediate section 58 has integral side wall portions 68 and 70, as seen in FIGURE 3, which are bent towards each other into abutting engagement to form a protruding lug having an aperture 72. An outer arm section 74 is slidably received in the slot formed in the end of the intermediate section 58.

The inner end of the outer arm section 74 is formed with a lug 76 and a pair of inwardly extending side walls 78 and 80 which receive the rectangular portion of the intermediate section 58. The terminal, or outer, end portion of the section 74 is detachably connected to a wiper blade 26 or 28 by any suitable means well known in the art. The outer section 74 is supported for sliding movement relative to the intermediate section 58, and is normally urged outwardly by means of a helical spring 82, one end of which engages means in the aperture 72 of the lug means on the intermediate arm section 58 and the other end of which engages the lug 76 on the outer arm section 74. The spring 82, as aforementioned, tends to move the outer arm section 74 away from the pivot shaft 55 so as to increase the radius of the terminal end of the wiper arm.

In the first embodiment, each escutcheon plate 56 and 56' includes an upstanding pin 84 and 84' which is eccentrically located relative to the axis of its respective pivot shaft. As seen in FIGURE 6, the pins 84 and 84' are located above the axis of the pivot shafts and closer to the side pillars of the windshield. A length of flexible cable 86 has one end connected to the pin 84 and the other end connected to the lug 76 on the outer wiper arm section 74. The cables 86 and 86' control the radius of the terminal end of the wiper arm during oscillation thereof across the surface of the windshield.

As seen in FIGURE 6, when the wiper arms are moved to a substantially horizontal position with the blades against the lower reveal molding the axis of each pivot shaft will lie between the pin 84 or 84' and the terminal end of the wiper arm. However, as the wiper arms are moved to the outboard stroke end position indicated by line 54 or 54' the pin 84 or 84' will lie between the axis of the pivot shaft and the terminal end of the arm. As disclosed in FIGURE 6, the radius of the terminal end of the wiper arm will be a maximum in the outboard stroke end positions as indicated by lines 54 and 54' and a minimum at the horizontal, or parked positions. As the wiper blades and arms are oscillated from the inboard stroke end positions 52 and 52' outwardly the outer end of the cables 86 and 86' will describe an arc having a gradually increasing radius thereby permitting the springs 82 to extend the outer arm sections 74 to a maximum at the outboard stroke end positions indicated by line 54. As the arms and blades are oscillated from the outboard stroke end position to the inboard stroke end position, the cables will retract the outer arm sections 74 due to the decreasing radius of the outer end of the cable with respect to the axis of the pivot shaft. Accordingly, during oscillation of the arms and blades toward the outboard stroke end limits, the arms will be automatically extended, and during oscillation toward the inboard stroke end limits the arms will be automatically retracted. This extension and retraction of the wiper arms will shift the path of movement of the wiper blades so as to increase the area of the upper half of the windshield which is cleaned by the wiper blades as compared to a conventional windshield wiper blade and arm assembly. The dotted lines in FIGURES 1, 6 and 8 indicate the paths of conventional wiper blade and arm assemblies showing the area wiped by the blades. The full lines indicate the shifted blade path and the increased area of the upper half of the windshield which is wiped with the extensible wiper arm and control means of the first embodiment.

With reference to FIGURES 1 and 8, the extensible wiper arm and control means can also be used advantageously in a windshield wiper system wherein a pair of blades and arms are oscillated symmetrically, or in tandem relationship. To accomplish this result, the reversing link 44 of the drive linkage shown in FIGURE 1 can be eliminated and the outer end of the drive link 40 can be directly connected to the crank arm 48. The pivot shaft bracket 18 on the passenger's side of the vehicle is moved closer towards the vehicle center line so that the wiper blades have overlapping paths adjacent the center of the windshield. Furthermore, in the embodiment shown in FIGURE 8, the pin 84 on the escutcheon 56 is located closer to the center of the vehicle than the axis of the pivot shaft so that when the wiper blade on the passenger's side is moved to a horizontal position the wiper arm will be fully retracted. This feature is of special significance since the windshield 10 has a wraparound portion at each side and by having the wiper arm fully retracted when the blade is in a horizontal position the blade does not have to conform to a curved surface as severe as if each arm were fully extended or a longer wiper blade were used in lieu of the extensible wiper arm of the present invention. The cleaning system disclosed in FIGURE 8 operates in the manner similar to that of FIGURE 6 in that a greater portion of the upper half of the windshield is traversed by the wiper blades, and both blades are fully extended at the outboard or right hand stroke end limit, and fully retracted at the horizontal, or parked position.

With reference to FIGURE 7, in the second embodiment the wiper arms are of the same construction as described in connection with FIGURE 2. However, the control means comprises a single length of cable 90, opposite ends of which are attached to the inner ends of the outer arm sections 74 and 74' of the wiper arms 22 and 24. The cable 90 extends through an opening in the escutcheon 56 into the plenum chamber beneath the cowl 16. The cable is guided about an idler pulley 92 on one side of the vehicle and an idler pulley 94 on the other side of the vehicle. The middle of the cable 90 is secured to a crank pin 96 attached to a crank arm 98 that is drivingly connected with a shaft 100. The shaft 100 is rotatably supported on a bracket, not shown, and has a gear 102 attached thereto. The gear 102 meshes with a gear 104 attached to the crank shaft 32, the diameter of gear 104 being one-half that of gear 102. Accordingly, the gear 102 will make one-half revolution of each revolution of the gear 104, and during each one-half revolution of the gear 102 the crank arm 98 and the pin 96 will be rotated 180°, or the maximum throw of the crank pin 96. The crank arm 98 and the gear 102 are drivingly connected with the gear 104 such that the crank pin 96 will be in a maximum throw position when the wiper arms are at their outboard stroke end limit. As seen in FIGURE 7, when the driver's wiper arm 24 is at the outboard stroke end limit during one stroke the arm will be fully extended. At the same time, the passenger's wiper arm 22 will be fully retracted. As the wiper arms are moved to the inboard stroke end limit, the crank arm 98 will be rotated 90° thereby restricting the driver's arm 24 to a half extended position and permitting extension of the arm 22 to the half way position. During the next outboard stroke, the arm 24 will be fully retracted at the outboard stroke end limit and the arm 22 will be fully extended, since the crank pin 96 will be at the opposite maximum throw position.

As seen in FIGURE 7, the wiper blades 26 and 28 move in alternate paths towards the surface of the windshield on alternate strokes. The arms are always half extended at the inboard stroke end limit and the horizontal parked position. By transversing alternate paths, the wiper blades clean a greater area of the windshield than in the first embodiment. That is, the total area of the windshield cleaned by the blades is greater in the second embodiment than in the first embodiment since on alternate strokes each wiper arm is fully retracted at the outboard stroke end limit position. In this manner the wiper blades actually clean an area substantially equivalent to that cleaned by a longer wiper blade and the overlapping blade system disclosed in the aforementioned copending application Serial No. 765,097.

While the embodiments of the invention as herein disclosed constitute preferred forms, it is to be understood that other forms might be adopted.

What is claimed is as follows:

1. Windshield wiper mechanism including, an oscillatable wiper shaft, a longitudinally adjustable wiper arm drivingly connected to said shaft and oscillatable between fixed stroke limits, resilient means operatively connected with said wiper arm for effecting longitudinal extension thereof, a wiper blade carried by said wiper arm for movement across the surface of a windshield, and cable means connected between said arm and a point eccentrically located with respect to said wiper shaft whereby said arm is extended adjacent one stroke limit and retracted adjacent the other stroke limit.

2. Windshield wiper mechanism including, an oscillatable wiper shaft, a longitudinally adjustable wiper arm drivingly connected to said wiper shaft and oscillatable between fixed stroke limits, said wiper arm comprising a pair of relatively movable sections and spring means biasing said sections in opposite directions to extend said wiper arm, a wiper blade carried by said wiper arm for movement across the surface of a windshield, and a cable having one end attached to one of said arm sections and the other end attached to a fixed point eccentrically located relative to the wiper shaft whereby said arm will be retracted adjacent one stroke limit and extended adjacent the other stroke limit.

3. Windshield wiper mechanism including, an oscillatable wiper shaft, a longitudinally adjustable wiper arm drivingly connected to said shaft and oscillatable between fixed stroke limits, said wiper arm including relatively movable inner and outer sections and spring means interconnecting said sections and biasing the outer section so as to extend the wiper arm, a stationary member within which said shaft is rotatably supported, a wiper blade carried by said wiper arm for movement across the surface of a windshield, and a cable having one end attached to the outer arm section and the other end attached to said stationary member at a point spaced from the axis of said shaft whereby said arm will be extended and retracted during oscillation of said arm between said fixed stroke limits.

4. Windshield wiper mechanism including, a pair of spaced oscillatable wiper shafts, a pair of longitudinally adjustable wiper arms drivingly connected to said shafts, drive means operatively connected with said shafts for imparting asymmetrical oscillation thereto between fixed stroke limits, wiper blades carried by said arms for movement across the surface of a windshield, and means operatively connected with said arms for controlling the extension and retraction thereof whereby said arms will be retracted and extended during oscillation thereof between said stroke limits, said wiper blades being in a substantially horizontal position adjacent one of said stroke limits, said arms being fully retracted when the wiper blades are in said substantially horizontal position.

5. Windshield wiper mechanism including, a pair of spaced oscillatable wiper shafts, a pair of longitudinally adjustable wiper arms drivingly connected to said shafts, drive means operatively connected with said shafts for imparting symmetrical oscillation thereto between fixed stroke limits, wiper blades carried by said arms for movement across the surface of a windshield, the paths of said wiper blades overlapping, and means operatively connected with said arms for controlling the extension and retraction thereof whereby said arms will be retracted and extended during oscillation thereof between said stroke limits, said wiper blades being in a substantially horizontal position adjacent one of said stroke limits, said arms being fully retracted when the wiper blades are in said substantially horizontal position.

6. Windshield wiper mechanism including, a pair of spaced oscillatable wiper shafts, a pair of longitudinally adjustable wiper arms drivingly connected to said shafts and oscillatable between inboard and outboard stroke limits, drive means operatively connected with said shafts for imparting asymmetrical oscillation thereto, and means actuated by said drive means in timed relation therewith for controlling the alternate extension and retraction of said wiper arms, the construction and arrangement being such that on alternate strokes one of said arms is fully extended adjacent its outboard stroke limit and the other arm is fully retracted adjacent its outboard stroke limit, and vice versa.

7. Windshield wiper mechanism including, a pair of spaced oscillatable wiper shafts, a pair of longitudinally adjustable wiper arms drivingly connected to said wiper shafts and oscillatable between the inboard and outboard stroke limits, drive means operatively connected with said wiper shafts for imparting asymmetrical oscillation thereto, means operatively connected with said arms for controlling the extension and retraction thereof, and gear reduction means between said drive means and said control means for controlling the alternate extension and retraction of said wiper arm whereby during alternate strokes of said wiper arms, one of said wiper arms will be progressively extended and the other of said wiper arms will be progressively retracted, and vice versa.

8. Windshield wiper mechanism including, a pair of spaced oscillatable wiper shafts, a pair of longitudinally adjustable arms drivingly connected to said shafts and oscillatable between inboard and outboard stroke end limits, drive means operatively connected with said shafts for imparting asymmetrical oscillation thereto, a wiper blade carried by each wiper arm for movement across the surface of a windshield, and means actuated by said drive means in timed relation therewith for controlling alternate extension and retraction of said arms whereby said wiper blades traverse different paths across the surface of said windshield on alternate strokes thereof.

9. Windshield wiper mechanism including, a pair of spaced oscillatable wiper shafts, a pair of longitudinally adjustable wiper arms drivingly connected to said wiper shafts and oscillatable between inboard and outboard stroke limits, resilient means operatively connected with each arm for effecting a longitudinal extension thereof, a wiper blade carried by each wiper arm for movement across the surface of said windshield, drive means operatively connected with said shafts for imparting asymmetrical oscillation thereto, and means operatively connected with said arms and actuated by said drive means for controlling the alternate extension and retraction thereof, the construction and arrangement being such that on alternate strokes one of said arms is fully extended adjacent its outboard stroke limit and the other arm is fully retracted adjacent its outboard stroke limit, and vice versa.

10. Windshield wiper mechanism including, a pair of spaced oscillatable wiper shafts, a pair of longitudinally adjustable wiper arms drivingly connected to said wiper shafts and oscillatable between inboard and outboard stroke limits, resilient means operatively connected with each arm for effecting longitudinal extension thereof, a wiper blade carried by each wiper arm for movement across the surface of a windshield, drive means operatively connected with said shafts for imparting asymmetrical oscillation thereto, a control cable having its ends operatively connected to said arms, a first gear driven by said drive means, a second gear having a pitch diameter twice the pitch diameter of said first gear and drivingly engaging said first gear, a crank mechanism driven by said second gear, and means attaching the intermediate portion of said cable to said crank mechanism whereby said wiper arms are alternately extended and retracted in timed relation with said drive means and said wiper blades traverse different paths on alternate strokes of said arms.

11. Windshield wiper mechanism including, an oscillatable wiper shaft, a longitudinally adjustable wiper arm drivingly connected to said shaft and oscillatable between fixed stroke limits, a wiper blade carried by said wiper arm for movement across the surface of a windshield, said wiper blade being in a substantially horizontal position adjacent one of said stroke limits, and means operatively connected with said arm for controlling the extension and retraction thereof whereby said arm will be retracted and extended during oscillation thereof between said stroke limits, the construction and arrangement being such that said wiper arm will be retracted when the wiper blade is in said substantially horizontal position.

12. Windshield wiper mechanism including, an oscillatable wiper shaft, a longitudinally adjustable wiper arm drivingly connected to said shaft and oscillatable between fixed stroke limits, resilient means operatively connected with said wiper arm for effecting longitudinal extension thereof, a wiper blade carried by said wiper arm for movement across the surface of a windshield, said wiper blade being in a substantially horizontal position adjacent one of said stroke limits, and cable means operatively connected with said arm for controlling the extension and retraction thereof whereby said arm will be retracted and extended during oscillation thereof between said stroke limits, the construction and arrangement being such that said wiper arm is retracted when the wiper blade is in said substantially horizontal position.

References Cited in the file of this patent

UNITED STATES PATENTS

| | | |
|---|---|---|
| 2,591,091 | O'Connor | Apr. 1, 1952 |
| 2,629,891 | Greene | Mar. 3, 1953 |
| 2,829,394 | Brigmon | Apr. 3, 1958 |

FOREIGN PATENTS

| | | |
|---|---|---|
| 202,095 | Australia | June 6, 1956 |
| 804,428 | France | Aug. 3, 1936 |